US008838300B2

(12) United States Patent
Cornell et al.

(10) Patent No.: US 8,838,300 B2
(45) Date of Patent: Sep. 16, 2014

(54) STANDBY AIRCRAFT MANAGEMENT SYSTEM

(75) Inventors: Bradley David Cornell, Lake Stevens, WA (US); Gordon Robert Andrew Sandell, Bothell, WA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 13/445,156

(22) Filed: Apr. 12, 2012

(65) Prior Publication Data

US 2013/0274962 A1 Oct. 17, 2013

(51) Int. Cl.
*G06F 7/70* (2006.01)

(52) U.S. Cl.
USPC .......................................... 701/14; 340/973

(58) Field of Classification Search
USPC ......... 701/3, 14, 15, 420; 340/971, 973; 70/3, 70/14, 15, 420
See application file for complete search history.

(56) References Cited

U.S. PATENT DOCUMENTS

| 4,654,846 A | 3/1987 | Goodwin et al. |
| 7,412,291 B2 | 8/2008 | Judd et al. |
| 2006/0156053 A1 | 7/2006 | Judd et al. |
| 2009/0112380 A1* | 4/2009 | Nutaro et al. ................... 701/14 |
| 2009/0112464 A1 | 4/2009 | Belcher |
| 2013/0013935 A1* | 1/2013 | Haukom et al. .............. 713/300 |
| 2013/0138269 A1* | 5/2013 | Pangilinan et al. ............... 701/3 |

FOREIGN PATENT DOCUMENTS

| FR | 2924213 A1 | 5/2009 |
| WO | WO2009068060 A1 | 6/2009 |

OTHER PUBLICATIONS

"Instrument and Equipment Items Required for Emergency Procedures," MMEL Policy Letter (PL) 63, Revision 4, Federal Aviation Administration, Jul. 2005, 2 Pages.
EP search report dated Jun. 27, 2013 regarding application 13162667.3-1802, reference P56900EP, applicant The Boeing Company, 5 pages.

* cited by examiner

*Primary Examiner* — Thomas G Black
*Assistant Examiner* — Luke Huynh
(74) *Attorney, Agent, or Firm* — Yee & Associates, P.C.

(57) ABSTRACT

A method and apparatus for operating an aircraft. An aircraft system comprises a housing, a standby aircraft management system, and a backup power system. The standby aircraft management system is associated with the housing and is configured to provide communications, navigation, and control of a number of aircraft systems needed for safe flight and landing of an aircraft in which the standby aircraft management system is located. The backup power system is configured to supply power to the standby aircraft management system when the power is unavailable from the aircraft.

17 Claims, 7 Drawing Sheets

STANDBY AIRCRAFT MANAGEMENT SYSTEM

BACKGROUND INFORMATION

1. Field

The present disclosure relates generally to aircraft and, in particular, to operating an aircraft. Still more particularly, the present disclosure relates to a method and apparatus for operating an aircraft with standby systems.

2. Background

Aircraft systems include increasingly more electronic systems. These electronic systems are used to navigate the aircraft, communicate with an air traffic controller (ATC), communicate with an airline operation center, and control operation of different aircraft systems. Electronic systems in the aircraft may include computers, sensors, routers, controllers, and other types of electronic systems. Aircraft systems that may be controlled include propulsion systems, environmental systems, lighting systems, fuel systems, hydraulic systems, and other types of systems.

Many of these electronic systems are part of the avionics of an aircraft. The avionics of an aircraft include, for example, communications systems, navigation systems, aircraft monitoring systems, aircraft flight control systems, weather systems, collision avoidance systems, radar systems, and other suitable types of systems. In designing these electronic systems, integration of components, functions, or a combination of the two for the different electronic systems with other electronic systems has occurs. This integration may be performed to reduce weight, cost, build time, and other factors.

For example, navigation and weather systems may share display devices, computational functions, or both. Information from both of these systems may be displayed on the same display devices at the same time or different times. Additionally, different systems may share computers or processor units, software functions, or a combination of the two.

Integrating electronic systems with each other may reduce the weight, cost, and build time for a system. The integration of systems into an integrated system may result in hardware, software, and/or other components being shared by more than one function. The integration may result in more than one function being affected in the integrated system when one or more components do not function as desired.

For example, if components supporting a function in the integrated system do not operate as desired, the function may not operate as desired. Additionally, other functions in the integrated system that use some or all of the same components also may be affected and may not operate as desired. For example, when components for communications in the integrated system do not operate as desired, navigation also may be affected.

As a result, increased redundancy may be needed to provide desired functions when one or more functions in an integrated system do not operate as desired. As a result, the weight, cost, and build time for an aircraft may be increased in providing the desired redundancy.

Therefore, it would be desirable to have a method and apparatus that takes into account at least some of the issues discussed above, as well as other possible issues.

SUMMARY

In one illustrative embodiment, an aircraft system comprises a housing and a standby aircraft management system. The standby aircraft management system is associated with the housing and is configured to provide communications, navigation, and control of a number of aircraft systems needed for safe flight and landing of an aircraft in which the standby aircraft management system is located.

In another illustrative embodiment, a standby aircraft management system comprises a housing, a location system, an interface, and a navigator. The location system is associated with the housing and is configured to identify location information for an aircraft during flight of the aircraft. The interface is associated with the housing and is configured to receive data from a number of aircraft systems using a number of direct connections to the number of aircraft systems. The navigator is associated with the housing and is configured to store a flight plan for the aircraft, receive the location information, and display navigation information using the flight plan, the location information, and the data.

In yet another illustrative embodiment, a method for operating an aircraft is provided. Location information is received from a location system associated with a standby aircraft management system. Data from a number of aircraft systems is received through an interface directly connected to the number of aircraft systems. Navigation information is generated using a flight plan stored in the standby aircraft management system for the aircraft, the location information, and the data. The navigation information is displayed on a display device. The aircraft is operated using the navigation information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account that desired operation of an aircraft for safe flight may not require as many functions and systems that may be present in a system with integrated functions. The illustrative embodiments recognize and take into account that the currently available backup systems may not provide as much functionality as desired for safe flight of the aircraft. For example, the illustrative embodiments recognize and take into account that a power failure may only leave a compass and a very high frequency (VHF) radio system available for navigation and communication. This functionality may be sufficient to fly the aircraft but may make flying the aircraft more difficult than desired.

The illustrative embodiments recognize and take into account that one solution may be to provide aircraft management functions at a desired level in the event that failures occur in the systems normally used to operate the avionics of the aircraft. In other words, instead of providing redundancy with the same functionality in the systems, a subset in the functionality needed for a desired operation of the aircraft may be implemented in a standby aircraft management system.

Figure 1:
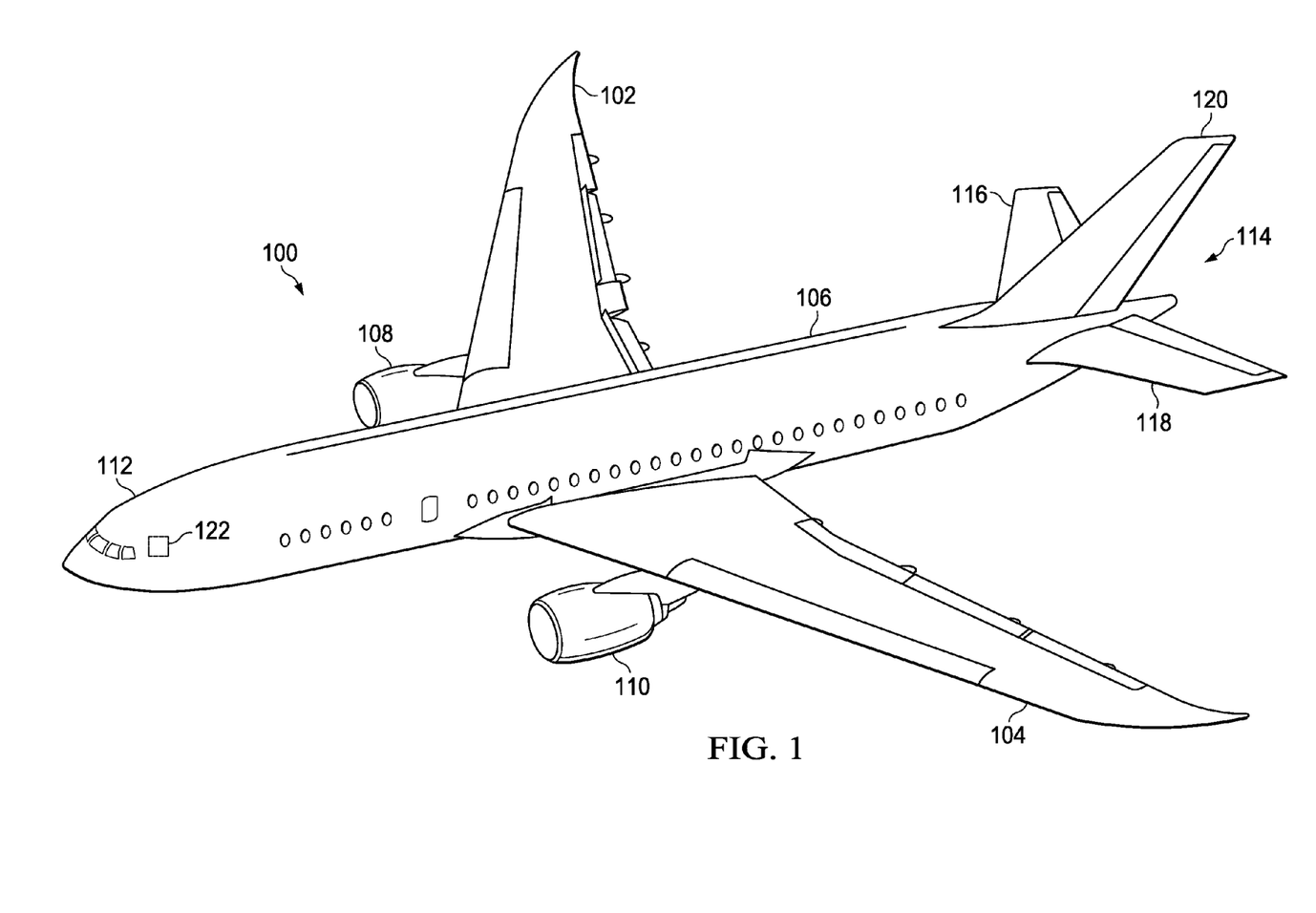
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of an aircraft in which standby aircraft management system 122 may be implemented in accordance with an illustrative embodiment. Standby aircraft management system 122 may be used to maintain desired operation of aircraft 100 if a number of systems in the avionics of aircraft 100 normally used to operate aircraft 100 do not function as desired. As used herein, a "number of", when used with reference to items, means one or more items. For example, a number of systems is one or more systems.

The event may be any event that causes undesired effects in the operation of one or more systems in the avionics of the aircraft. The event may be, for example, without limitation, an inability to generate power for the number of systems, a power surge, a lightning strike, an inability of circuits or software in the number of systems to operate as desired, and other events. Standby aircraft management system 122 may be used when the power delivered to the avionics is insufficient for desired operation of the avionics in aircraft 100.

In one illustrative embodiment, standby aircraft management system 122 may comprise a housing, a location system in the housing, an interface associated with the housing, and a navigator associated with the housing. The location system is configured to identify location information for aircraft 100 during flight of aircraft 100. The interface is configured to receive data from a number of aircraft systems using a number of direct connections to the number of aircraft systems. The navigator is configured to store a flight plan for the aircraft, receive the location information, and display the navigation information using the flight plan, the location, and the data.

When one component is "associated" with another component, the association is a physical association in these depicted examples. For example, a first component, such as the location system, may be considered to be associated with a second component, such as the housing, by being secured to the second component, bonded to the second component, mounted to the second component, located inside of the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Figure 2:
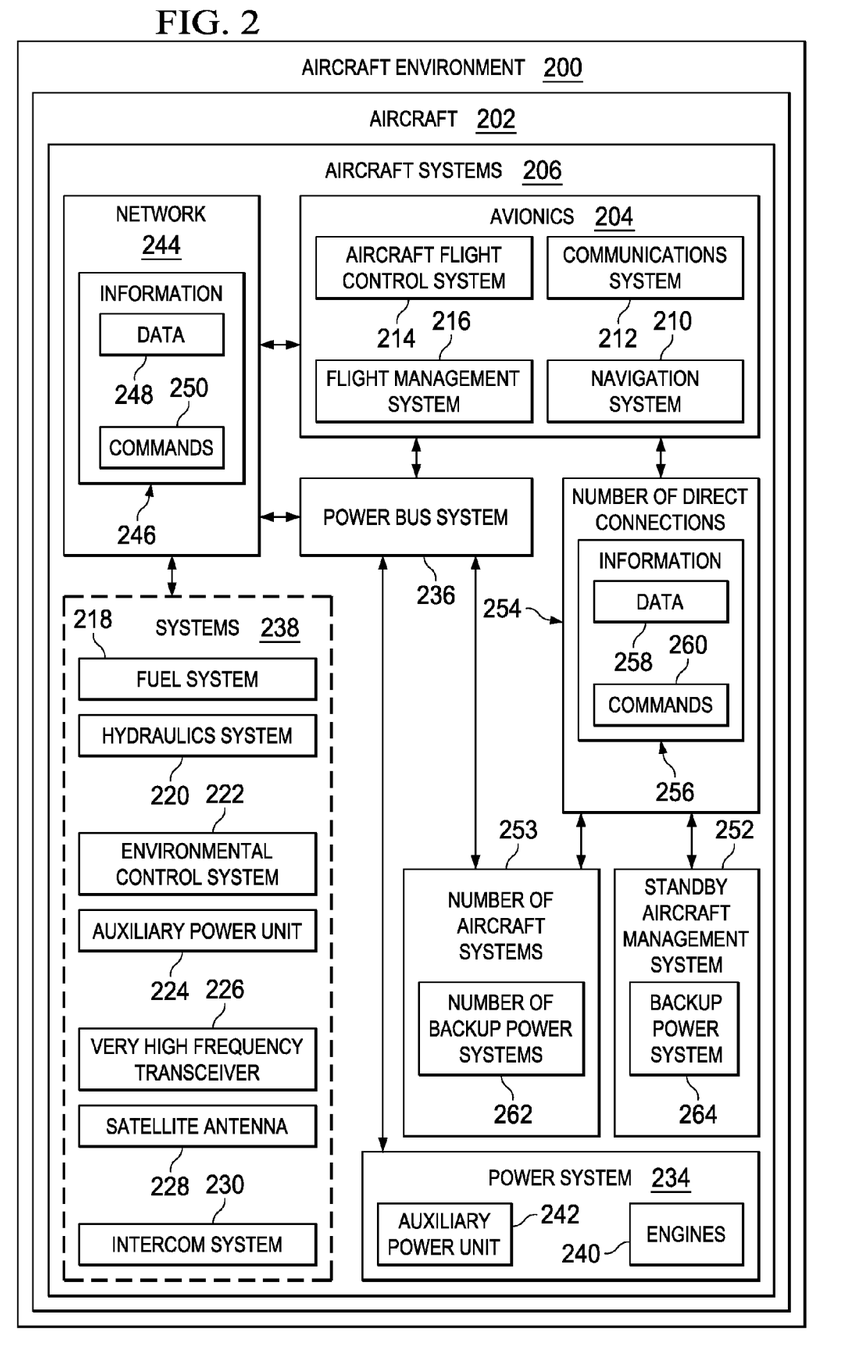
FIG. 2 is an illustration of a block diagram of an aircraft environment in accordance with an illustrative embodiment.

Turning now to FIG. 2, an illustration of a block diagram of an aircraft environment is depicted in accordance with an illustrative embodiment. In this illustrative example, aircraft environment 200 includes aircraft 202. Aircraft 100 in FIG. 1 is an example of one implementation for aircraft 202 shown in block form in this figure.

As depicted, aircraft 202 has avionics 204 and aircraft systems 206. Avionics 204 comprises electronic systems used to operate aircraft 202. These electronic systems may include, for example, without limitation, at least one of navigation system 210, communications system 212, aircraft flight control system 214, flight management system 216, and other suitable systems.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Aircraft systems 206 are systems in aircraft 202 that operate to fly aircraft 202. For example, aircraft systems 206 may include at least one of fuel system 218, hydraulics system 220, environmental control system 222, auxiliary power unit 224, very high frequency transceiver 226, satellite antenna 228, intercom system 230, and power system 234. At least some of aircraft systems 206 are needed to operate aircraft 202 in a desired manner for safe flight of aircraft 202.

In these illustrative examples, power bus system 236 is a bus system that is connected to power system 234. Power bus system 236 is also connected to avionics 204 and to systems 238 in aircraft systems 206. In this manner, power bus system 236 is configured to distribute power from power system 234. In these illustrative examples, power system 234 may include engines 240 and auxiliary power unit 242 in aircraft 202.

Additionally, aircraft 202 also includes network 244. Network 244 provides a connection between avionics 204 and aircraft systems 206. Additionally, network 244 also may provide a connection between different components in avionics 204. Network 244 may take a number of different forms. For example, network 244 may include at least one of wires, optical fibers, routers, switches, wireless devices, and other suitable components configured to establish wireless communications links.

In these illustrative examples, information 246 may be exchanged between avionics 204 and aircraft systems 206 through network 244. In addition, information 246 also may be exchanged between different components in avionics 204 using network 244.

As depicted, avionics 204 may receive data 248 in information 246 from aircraft systems 206. For example, without limitation, the data may be at least one of a fuel level, an air pressure, a cabin temperature, a surface control position, an airspeed, an altitude, a hydraulic fluid pressure, an engine temperature, an engine speed, and other suitable types of data.

Additionally, avionics 204 may send commands 250 in information 246 to aircraft systems 206. These commands may include, for example, without limitation, commands to change a control surface position, a cabin temperature, an engine speed, power generation, and other suitable types of commands.

In these illustrative examples, standby aircraft management system 252 also is present in aircraft 202. Standby aircraft management system 252 is used as a backup to one or more systems in avionics 204. In particular, standby aircraft management system 252 may be used to provide for desired operation of aircraft 202 in the event that one or more systems in avionics 204 do not operate as desired. In particular, standby aircraft management system 252 may be used by an operator of aircraft 202 to fly aircraft 202 in a manner that is needed for safe flight of aircraft 202.

In these illustrative examples, standby aircraft management system 252 may be connected to number of aircraft systems 253 in aircraft systems 206 through number of direct connections 254. Number of aircraft systems 253 may include aircraft systems in aircraft systems 206 that are also connected to network 244 in which network 244 is normally used by avionics 204 to control the operation of number of aircraft systems 253. Some of number of aircraft systems 253 may be aircraft systems in aircraft systems 206 that are not used under normal operating conditions of aircraft 202. These aircraft systems may be standby aircraft systems that are used when primary aircraft systems in aircraft systems 206 are unavailable or do not function as desired. In the illustrative examples, the standby aircraft systems may still be controlled by avionics 204 if avionics 204 operates as desired.

In these illustrative examples, number of direct connections 254 is made without needing to use network 244. Number of direct connections 254 may be made using at least one of wires, optical fibers, and other suitable types of connections to number of aircraft systems 253.

In these illustrative examples, number of direct connections 254 may be made such that standby aircraft management system 252 is able to exchange information 256 with number of aircraft systems 253 even if network 244 does not operate as desired. For example, if power system 234 is unable to provide power at a desired level in aircraft 202, number of direct connections 254 is configured to still operate even if power system 234 does not provide sufficient power to operate network 244 for exchanging information 246. In these illustrative examples, standby aircraft management system 252 may still exchange information 256 with number of aircraft systems 253.

Further, number of direct connections 254 also may be made to avionics 204 to provide for exchange of information 256 in some illustrative examples. In this manner, standby aircraft management system 252 may receive data 258 in information 256, send commands 260 in information 256, or some combination thereof with respect to number of aircraft systems 253.

In these illustrative examples, desired operation of number of aircraft systems 253 may be provided through power bus system 236 if power system 234 is unable to provide a desired level of power. In particular, power may be provided to number of aircraft systems 253 using number of backup power systems 262. Number of backup power systems 262 is configured to provide power to number of aircraft systems 253 independently of the power system normally used to provide power to these aircraft systems. For example, number of backup power systems 262 is configured to provide power to these aircraft systems when power system 234 is unable to provide a desired amount of power. Number of backup power systems 262 also may aid in exchanging information 256 over number of direct connections 254.

Number of backup power systems 262 may take the form of backup power devices that are associated with each of number of aircraft systems 253. Number of backup power systems 262 may take a number of different forms. For example, a backup power system in number of backup power systems 262 includes a battery system, an energy harvesting device, and other suitable types of backup power systems. In these illustrative examples, energy harvesting devices that may be used include, for example, without limitation, thermoelectric generators, piezoelectric generators, and other suitable types of energy harvesting devices.

In these illustrative examples, standby aircraft management system 252 also may include backup power system 264. Backup power system 264 is configured to provide power to standby aircraft management system 252 independently of the power system normally used to provide power to different aircraft systems. In addition to being used to operate standby aircraft management system 252, backup power system 264 also may provide power for use in exchanging information 256 over number of direct connections 254.

In this manner, standby aircraft management system 252 may still exchange information with number of aircraft systems 253 in the event that power system 234 is unable to provide a desired level of power to number of aircraft systems 253, network 244, or some combination thereof. Further, with number of direct connections 254, standby aircraft management system 252 also may exchange information with number of aircraft systems 253 if network 244 does not operate as desired for some reason other than a lack of power.

Figure 3:
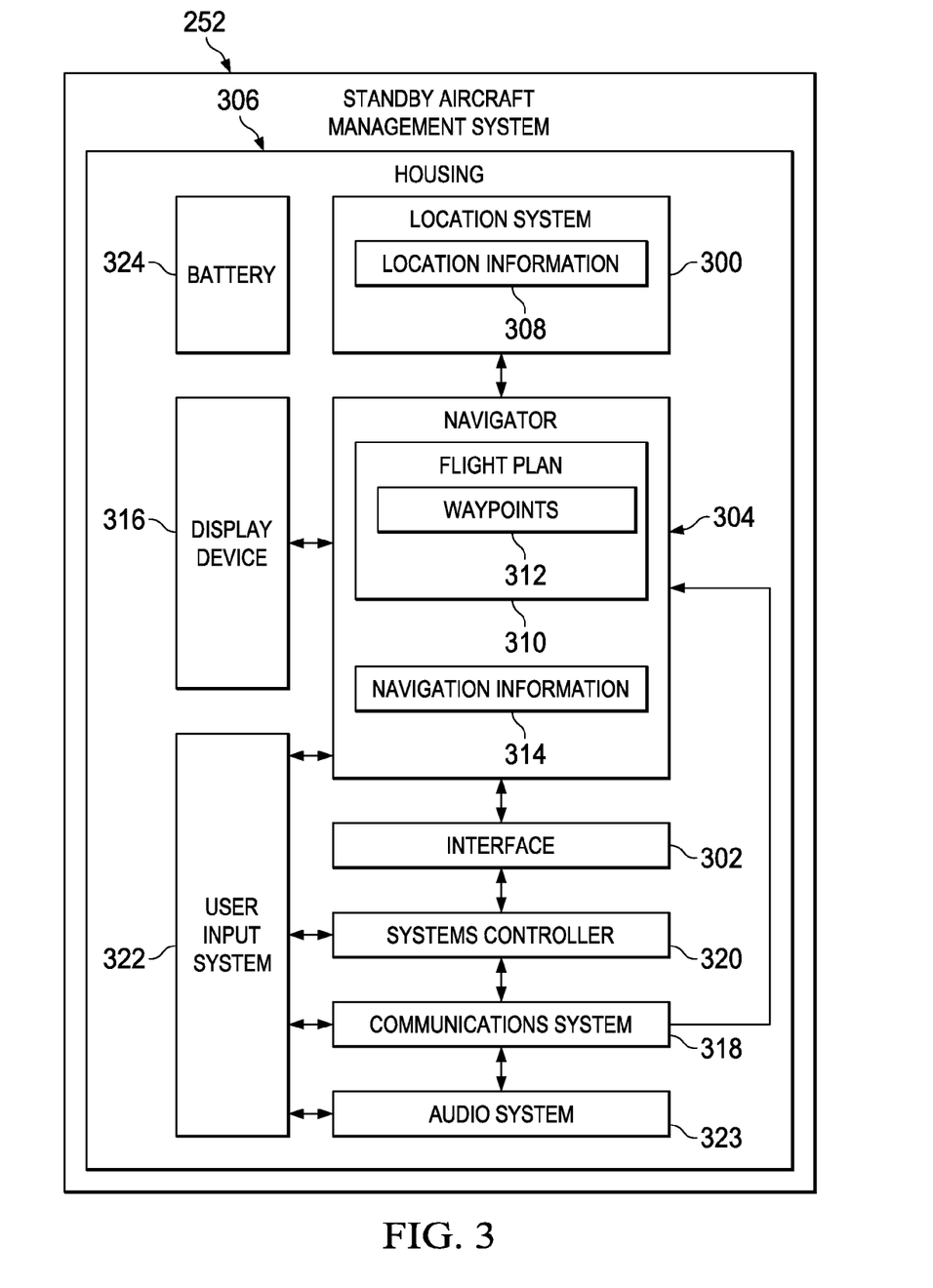
FIG. 3 is an illustration of a block diagram of an implementation for a standby aircraft management system in accordance with an illustrative embodiment.

Turning now to FIG. 3, an illustration of a block diagram of an implementation for a standby aircraft management system is depicted in accordance with an illustrative embodiment. Examples of components that may be present in standby aircraft management system 252 are illustrated in this figure.

As depicted, standby aircraft management system 252 may include location system 300, interface 302, and navigator 304. These components may be associated with housing 306. Location system 300 is configured to identify location information 308 for aircraft 202 during flight of aircraft 202 in FIG. 2. In these illustrative examples, location system 300 may take various forms. For example, location system 300 may be a global positioning system (GPS) receiver and a global positioning system antenna.

Interface 302 is configured to be associated with number of direct connections 254 in FIG. 2. Interface 302 is configured to exchange information 256 with number of aircraft systems 253 using number of direct connections 254 in FIG. 2. For example, interface 302 may receive data 258 from number of aircraft systems 253 in FIG. 2.

Navigator 304 is associated with housing 306 and is configured to store flight plan 310 for aircraft 202. Flight plan 310 may comprise waypoints 312 and other suitable information.

Further, navigator 304 is configured to receive location information 308 from location system 300. In these illustrative examples, location information 308 may include a location of the aircraft. More specifically, the location is a current location of the aircraft. Navigator 304 also may receive data 258 from number of aircraft systems 253 through interface 302. Navigator 304 may display navigation information 314 on display device 316. Display device 316 may be, for example, without limitation, a liquid crystal display (LCD) device, a flat panel display device, a plasma display device, or some other display associated with housing 306.

In this manner, standby aircraft management system 252 may provide navigation information 314 to an operator of aircraft 202. The navigation information may comprise waypoints 312 and a location of the aircraft with respect to waypoints 312. With navigation information 314, an operator of aircraft 202 may operate flight controls for aircraft 202 and may have more information than currently available when avionics 204 in FIG. 2 does not operate as desired.

Further, standby aircraft management system 252 also may include other functions. For example, standby aircraft management system 252 also may include communications system 318. Communications system 318 may be associated with housing 306. In these illustrative examples, an operator may operate communications system 318 for voice communications through user input system 322. For example, an operator may use a microphone in user input system 322 to send voice communications to communications system 318. In these illustrative examples, voice communications received by communications system 318 may be output on audio system 323. In these illustrative examples, audio system 323 may be a speaker in housing 306. In other illustrative examples, audio system 323 may be absent, and the voice communications may be output to an external audio system, such as a headset.

Additionally, communications system 318 also may be used to transmit and receive data. In this illustrative example, communications system 318 is also connected to navigator 304. Communications system 318 may facilitate data communications, such as automatic dependent surveillance and controller, pilot data link communication, and other types of data communications. These voice and data communications may be, for example, with an air traffic controller, an airline operations center, or both.

Communications system 318 may be, for example, a radio frequency transceiver. In other illustrative examples, communications system 318 may be a satellite communications transceiver. In yet other illustrative examples, communications system 318 may be connected to at least one of very high frequency transceiver 226, satellite antenna 228, and intercom system 230 through number of direct connections 254 in FIG. 2 between these systems and interface 302.

As yet another illustrative example, standby aircraft management system 252 may include systems controller 320. Systems controller 320 is configured to control at least a portion of number of aircraft systems 253. Systems controller 320 also may exchange information 256 with number of aircraft systems 253. For example, systems controller 320 may receive data 258 and send commands 260 to at least a portion of number of aircraft systems 253. The portion of number of aircraft systems 253 may be aircraft systems in number of aircraft systems 253 that are needed for desired operation of aircraft 202. In one illustrative example, the desired operation is for safe flight and landing of aircraft 202.

As depicted, user input system 322 may be associated with housing 306. User input system 322 may be used to receive user input from the operator. User input system 322 may be used to cause systems controller 320 to generate commands 260 for controlling at least one of number of aircraft systems 253. User input system 322 may take a number of different forms. For example, in addition to a microphone, user input system 322 may include at least one of a cursor control device, a joystick, a keyboard, a touch screen, and other suitable types of input devices.

In these illustrative examples, standby aircraft management system 252 also may include battery 324 as an implementation for backup power system 264 in FIG. 2. Battery 324 may provide power for any hardware components in standby aircraft management system 252.

As depicted, standby aircraft management system 252 may be implemented in a number of different forms. For example, standby aircraft management system 252 may be implemented using a computer or other device. In one illustrative example, standby aircraft management system 252 may be implemented using a tablet computer.

In these illustrative examples, different components in standby aircraft management system 252 may be implemented using hardware, software, or a combination of the two. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

The illustration of aircraft environment 200 and components, such as standby aircraft management system 252 in FIG. 2 and FIG. 3, is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, aircraft systems 206 may include other aircraft systems in addition to or in place of the ones illustrated. For example, aircraft systems 206 may include a lighting system and other suitable types of systems.

As another example, an additional number of standby aircraft management systems may be present in addition to standby aircraft management system 252. Each of these systems may be used by a different operator of aircraft 202.

Figure 4:
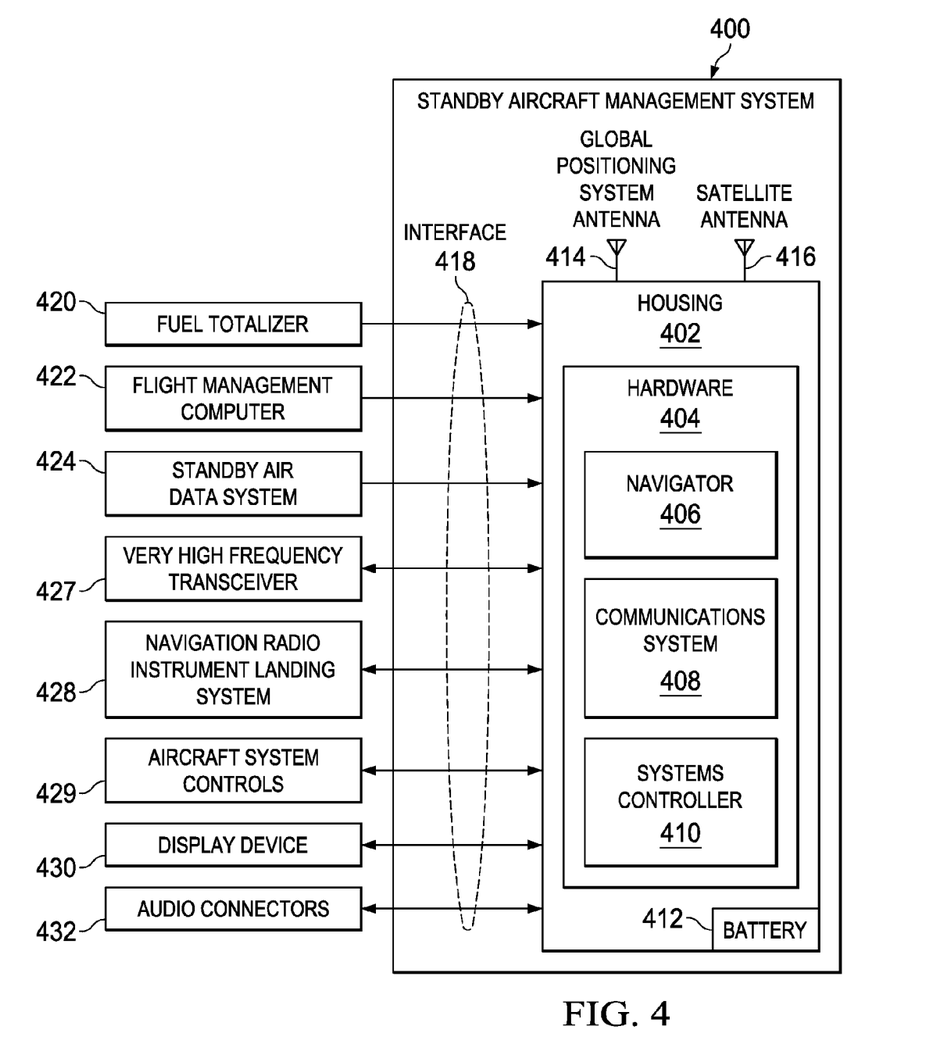
FIG. 4 is an illustration of a block diagram of a standby aircraft management system in accordance with an illustrative embodiment.

With reference now to FIG. 4, an illustration of a block diagram of a standby aircraft management system is depicted in accordance with an illustrative embodiment. In this depicted example, standby aircraft management system 400 is an example of one implementation of standby aircraft management system 252 in FIG. 2 and FIG. 3.

As depicted, standby aircraft management system 400 comprises housing 402. As depicted, hardware 404 is present within housing 402. Hardware 404 includes navigator 406, communications system 408, and systems controller 410. Hardware 404 may be implemented in a number of different ways. For example, hardware 404 may be circuits specifically designed to perform the functions of navigator 406, communications system 408, and systems controller 410.

In other illustrative examples, software also may be present that runs on hardware 404. For example, hardware 404 may be a processor unit that runs software configured to perform functions for navigator 406, communications system 408, and systems controller 410. In these illustrative examples, battery 412 is located in housing 402 and provides power for hardware 404. Battery 412 is an internal battery in these illustrative examples.

Additionally, standby aircraft management system 400 also includes global positioning system antenna 414 and satellite antenna 416. Global positioning system antenna 414 may receive signals from satellites to identify a location of standby aircraft management system 400. Satellite antenna 416 is an antenna configured to send and receive signals for communications via a satellite system.

In these illustrative examples, interface 418 provides a direct connection from standby aircraft management system 400 to various aircraft systems. For example, interface 418 may be connected to fuel totalizer 420, flight management computer 422, standby air data system 424, very high frequency transceiver 427, navigation radio instrument landing system 428, and aircraft system controls 429. Fuel totalizer 420 is configured to provide information about fuel usage by the aircraft. Flight management computer 422 is a flight management computer in the aircraft. Standby aircraft management system 400 may receive a flight plan from flight management computer 422 in these illustrative examples.

Standby air data system 424 is a system in an aircraft system that provides information about the speed of the aircraft, the altitude of the aircraft, and other information. In these illustrative examples, interface 418 may receive data from systems, such as fuel totalizer 420, flight management computer 422, and standby air data system 424. Very high frequency transceiver 427 is configured to provide voice radio communications. Navigation radio instrument landing system 428 is a radio that may be used to obtain data for approaching and landing on a runway. Navigation radio instrument landing system 428 may receive a combination of radio signals providing information for safe landing. These communications systems may also transmit voice and data.

Aircraft system controls 429 are controls for controlling a portion of the aircraft systems. In these illustrative examples, those controls may be controls to aircraft systems, such as fuel systems, hydraulics systems, environmental systems, lighting systems, an auxiliary power unit, and other suitable systems.

As depicted, standby aircraft management system 400 may send commands to aircraft system controls 429 for the portion of the aircraft systems that are selected as needed for controlling operation of the aircraft for desired flight of the aircraft. In some cases, data also may be received from aircraft system controls 429. Interfaces for controlling these aircraft systems may be generated by aircraft system controls 429 and displayed on display device 430. These interfaces may display information and may allow user interaction to change parameters for the aircraft systems.

Display device 430 is a device on which information, such as navigation information, may be displayed. Display device 430 may be built into housing 402 or may be an external device, such as a display device in the flight deck of the aircraft. In the illustrative examples, a map with waypoints from the flight plan may be displayed on display device 430. Audio connectors 432 provide connections for audio devices, such as speakers, a headset, a microphone, or some other combination of devices.

In these illustrative examples, interface 418 is configured for a direct connection to the components illustrated in this example. Housing 402 with hardware 404 and interface 418 may be implemented in a number of different ways. For example, without limitation, these components may be implemented as part of a device selected from one of a tablet computer, an electronic flight bag, a mobile phone, a laptop computer, or some other suitable device.

The illustration of standby aircraft management system 400 in FIG. 4 is not meant to imply physical or architectural limitations to the manner in which different illustrative embodiments may be implemented. Standby aircraft management system 400 in FIG. 4 is only presented as an example of one implementation for standby aircraft management system 252 in FIG. 2. For example, in some illustrative embodiments, standby aircraft management system 400 also may include a network interface to flight management computer 422 rather than using direct connections through interface 418.

In some illustrative examples, other components may be used in addition to or in place of the ones illustrated. For example, depending on the implementation, connection to aircraft system controls 429 may not be present. In still other illustrative examples, display device 430 may be integrated in housing 402. In still other illustrative examples, satellite antenna 416 may be absent if communications system 408 does not use satellite communications. A radio frequency antenna may be used in place of satellite antenna 416 if communications system 408 and hardware 404 includes a radio frequency transmitter. Communications system 408 also may be connected to the flight interphone and passenger address systems for communicating within the aircraft.

Figure 5:
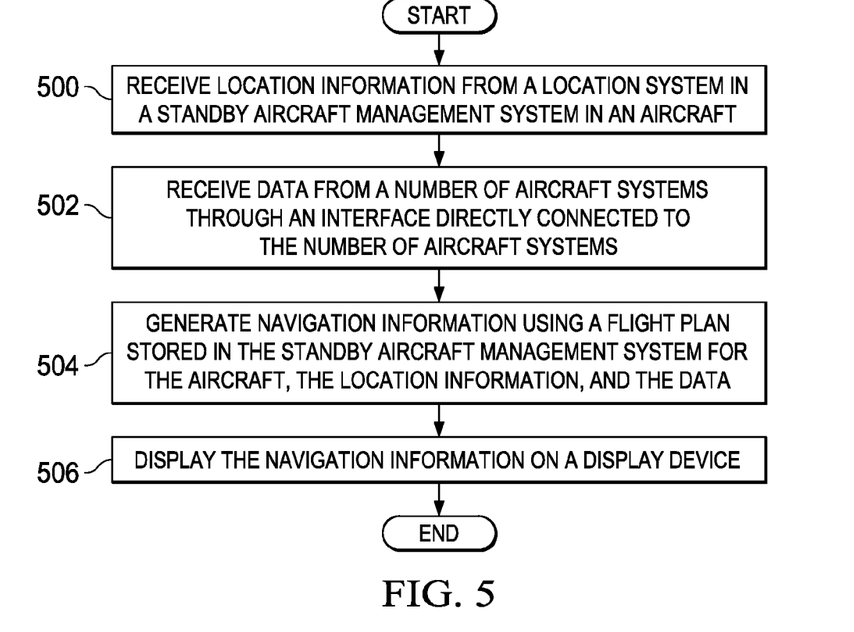
FIG. 5 is an illustration of a flowchart of a process for operating an aircraft in accordance with an illustrative embodiment.

Turning now to FIG. 5, an illustration of a flowchart of a process for operating an aircraft is depicted in accordance with an illustrative embodiment. The process illustrated in FIG. 5 may be implemented in aircraft environment 200 in FIG. 2. In particular, this process may be implemented using standby aircraft management system 252 as depicted in FIG. 2 and FIG. 3.

The process begins by receiving location information from a location system in a standby aircraft management system in an aircraft (operation 500). The process receives data from a number of aircraft systems through an interface directly connected to the number of aircraft systems (operation 502).

The process generates navigation information using a flight plan stored in the standby aircraft management system for the aircraft, the location information, and the data (operation 504). The process then displays the navigation information on a display device (operation 506), with the process terminating thereafter.

With the display of the navigation information, an operator may use this information to control flight of the aircraft. For example, the operator may steer the aircraft and change altitudes based on the navigation information even though a flight management system or navigation computer normally used in the aircraft is unable to function as desired.

Figure 6:
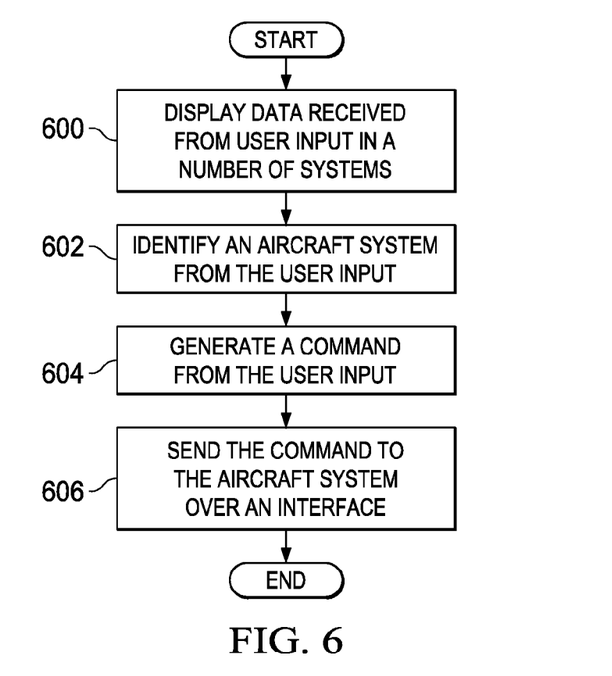
FIG. 6 is an illustration of a flowchart of a process for operating an aircraft in accordance with an illustrative embodiment.

Turning now to FIG. 6, an illustration of a flowchart of a process for operating an aircraft is depicted in accordance with an illustrative embodiment. The process illustrated in FIG. 6 may be implemented in aircraft environment 200 in FIG. 2. In particular, this process may be implemented using standby aircraft management system 252 as depicted in FIG. 2 and FIG. 3.

The process begins by displaying data received from user input in a number of systems (operation 600). When user input is received, the process identifies an aircraft system from the user input (operation 602).

The process then generates a command from the user input (operation 604). The command is then sent to the aircraft system over an interface (operation 606), with the process terminating thereafter. In this manner, an operator may still control some of the number of aircraft systems even though an aircraft management system in the avionics may not function as desired.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
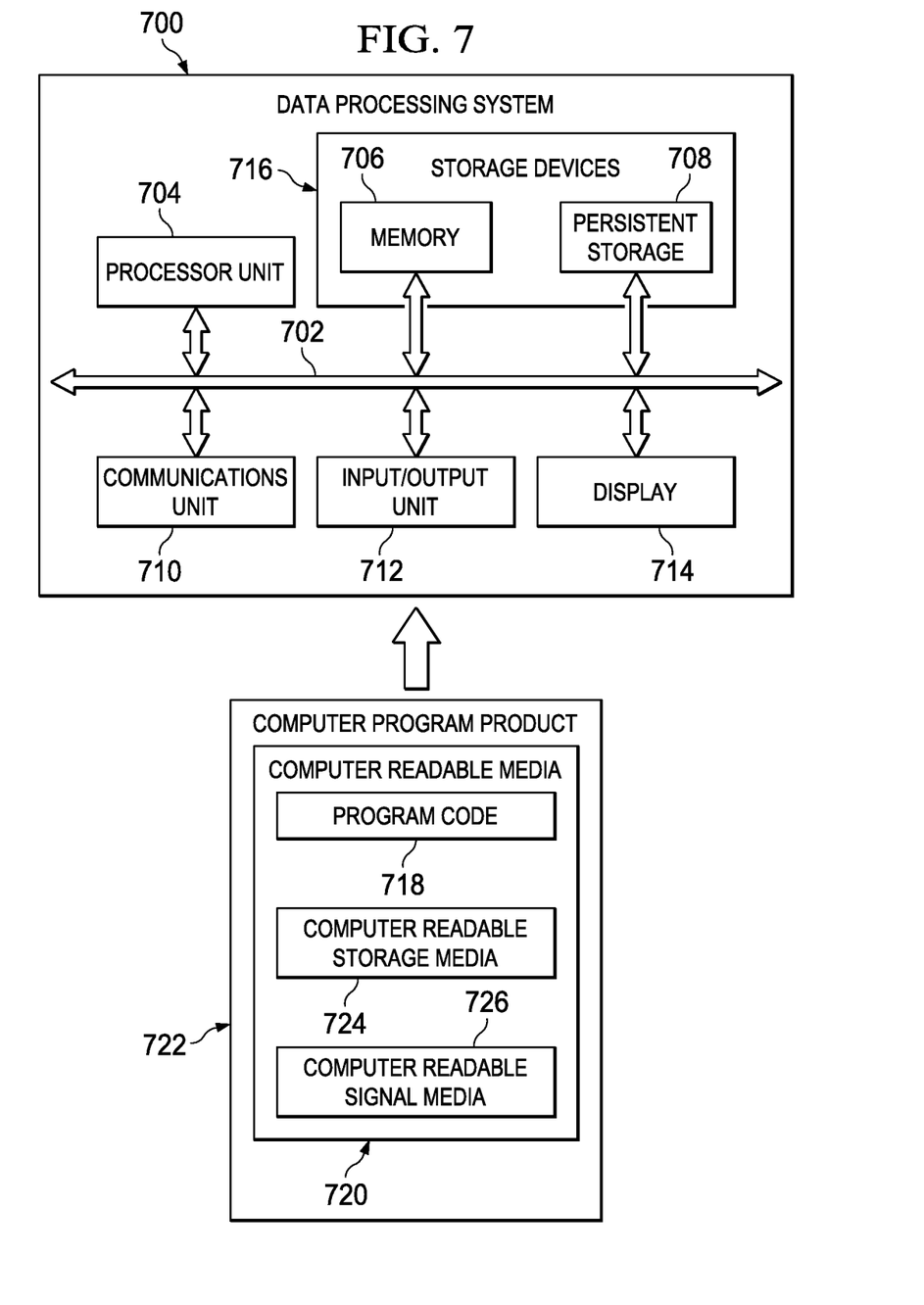
FIG. 7 is an illustration of a data processing system in accordance with an illustrative embodiment.

Turning now to FIG. 7, an illustration of a data processing system is depicted in accordance with an illustrative embodiment. Data processing system 700 is an example of hardware that may be used to implement a standby aircraft management system, such as standby aircraft management system 252 in FIGS. 2 and 3 and standby aircraft management system 400 in FIG. 4. For example, data processing system 700 may be used to implement hardware 404.

In this illustrative example, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a cursor control device, a touch screen, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726. In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Figure 8:
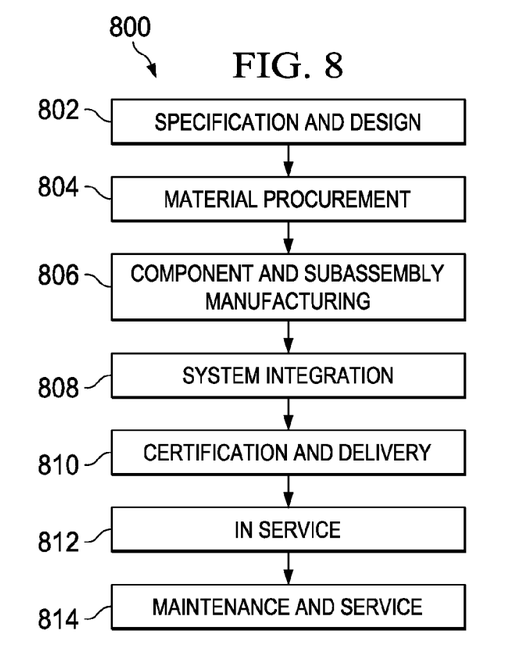
FIG. 8 is an illustration of an aircraft manufacturing and service method in accordance with an illustrative embodiment.
Figure 9:
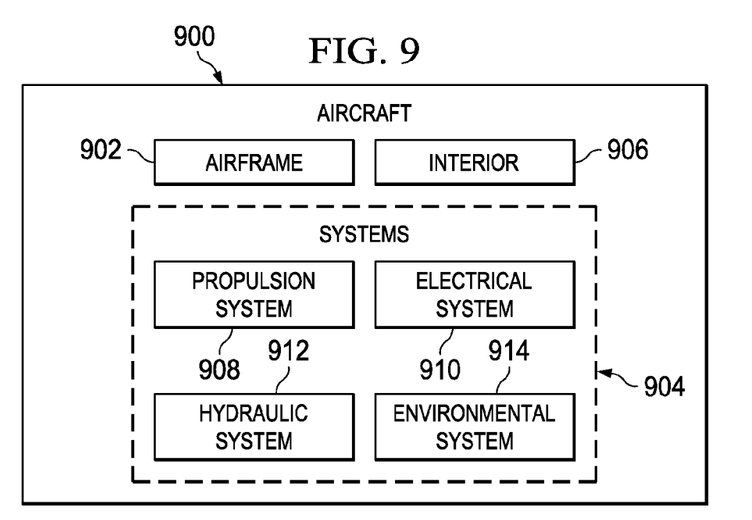
FIG. 9 is an illustration of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with a plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. For example, standby aircraft management system 252 may be included in designs for aircraft 900 during specification and design 802. In other illustrative examples, standby aircraft management system 252 may be manufactured during component and subassembly manufacturing 806 and integrated into aircraft 900 during system integration 808.

In these illustrative examples, standby aircraft management system 252 may be used by operators of aircraft 900 to provide for desired flight of aircraft 900 if other systems do not perform as desired. Further, standby aircraft management system 252 may be included in aircraft 900 as an upgrade to aircraft 900 during maintenance and service 814.

Thus, the illustrative embodiments provide a method and apparatus for managing operation of an aircraft in the event that primary or normally-used systems are unavailable. This unavailability may be caused by events, such as a reduction in the amount of power generated by power generators, one or more components in the avionics not functioning as desired, or some other event.

The standby aircraft management system in the illustrative examples provides an ability to perform at least one of displaying navigation information, facilitating voice and data communications, and controlling aircraft systems. With one or more of these different functions, performing continued operation of the aircraft may be easier than with currently available backup systems. In this manner, operations may be performed that result in flight of the aircraft that is as safe as desired when the primary or normally relied on avionics are unavailable or do not provide the desired level of functionality.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft system comprising:
   a housing;
   a standby aircraft management system associated with the housing and configured to provide communications, navigation, and control of a number of aircraft systems needed for flight and landing of an aircraft in which the standby aircraft management system is located when at least one of: a network, configured to connect avionics in the aircraft to systems in the aircraft, does not operate as desired; and a power bus system is unable to provide a desired level of power to the network;
   a number of direct connections configured to exchange information between the standby aircraft management system and the number of aircraft systems when the network does not work as desired, such that the number of aircraft systems comprises a standby aircraft system that only operates when a primary aircraft system does not function as desired; and
   a backup power system configured to supply power to the standby aircraft management system when the power is unavailable from the aircraft, such that the housing, the standby aircraft management system, and the backup power system are located in at least one of: a tablet computer, and an electronic flight bag.

2. The aircraft system of claim 1, wherein the standby aircraft management system comprises:
   a location system configured to identify location information for the aircraft during flight of the aircraft;
   a navigator configured to store a flight plan for the aircraft, receive the location information, and display navigation information using the flight plan, the location information, and the navigation information;
   a communications system;
   a systems controller configured to control at least a portion of the number of aircraft systems; and
   an interface configured to receive data from the number of aircraft systems using the number of direct connections to the number of aircraft systems and send commands to the at least the portion of the number of aircraft systems.

3. A standby aircraft management system comprising:
   a housing;
   a location system associated with the housing, wherein the location system is configured to identify location information for an aircraft during flight of the aircraft;
   an interface associated with the housing and configured to receive data from a number of aircraft systems using a network interface comprising direct connections to the number of aircraft systems, the network interface being distinct from a first network, the first network configured to connect avionics in the aircraft to systems in the aircraft, and such that the number of aircraft systems comprises a standby aircraft system that only operates when a primary aircraft system does not function as desired; and
   a navigator associated with the housing and configured to store a flight plan for the aircraft, receive the location information, and display navigation information using the flight plan, the location information, and the data, such that the housing, the location system, the network interface, and the navigator are each part of a device selected from at least one of: a tablet computer, an electronic flight bag, a mobile phone, and a laptop computer.

4. The standby aircraft management system of claim 3, further comprising:
   a communications system located in the housing.

5. The standby aircraft management system of claim 3, further comprising:
   a systems controller configured to control at least a portion of the number of aircraft systems.

6. The standby aircraft management system of claim 5, further comprising the interface configured to send commands to the at least the portion of the number of aircraft systems.

7. The standby aircraft management system of claim 5, wherein the at least the portion of the number of aircraft systems is selected from at least one of: a fuel system, a hydraulics system, an auxiliary power unit, an environmental control system, a very high frequency transceiver, a satellite antenna, and an intercom system.

8. The standby aircraft management system of claim 5, further comprising the at least the portion of the number of aircraft systems configured to provide desired flight of the aircraft.

9. The standby aircraft management system of claim 3, further comprising:
   a battery system.

10. The standby aircraft management system of claim 3, further comprising the navigator configured to receive waypoints for the flight plan in response to an event in which the navigation information comprises the waypoints and a location of the aircraft with respect to the waypoints.

11. The standby aircraft management system of claim 3, wherein the location system comprises a global positioning system receiver and a global positioning system antenna.

12. A method for operating an aircraft, the method comprising:
   receiving location information from a location system associated with a standby aircraft management system;
   receiving data from a number of aircraft systems through a network interface connected to the number of aircraft systems such that the number of aircraft systems comprises a standby aircraft system that only operates when a primary aircraft system does not function as desired, and the network interface being distinct from a first network, the first network configured to connect avionics in the aircraft to systems in the aircraft;
   generating navigation information using: a flight plan stored in the standby aircraft management system for the aircraft, the location information, and the data, such that the location system, the network interface, and the flight plan each comprised by a device selected from at least one of: a tablet computer, an electronic flight bag, a mobile phone, and a laptop computer;
   displaying the navigation information on a display device; and
   operating the aircraft using the navigation information via a number of direct connections exchanging information between the standby aircraft management system and the number of aircraft systems when the first network does not work as desired, such that the number of aircraft systems comprises the standby aircraft system that only operates when the primary aircraft system does not function as desired.

13. The method of claim 12, wherein the standby aircraft management system further comprises a communications system located in a housing.

14. The method of claim 12, further comprising:
   controlling at least a portion of the number of aircraft systems using a systems controller in the standby aircraft management system.

15. The method of claim 14, wherein the at least the portion of the number of aircraft systems further comprise a fuel system, a hydraulics system, an auxiliary power unit, an environmental control system, a very high frequency transceiver, a satellite antenna, and an intercom system.

16. The method of claim 14, wherein the location system comprises a global positioning system receiver and a global positioning system antenna.

17. The method of claim 12, wherein displaying the navigation information on the display device comprises:
   displaying waypoints and a location of the aircraft with respect to the waypoints.

* * * * *